United States Patent
Dahl

(10) Patent No.: US 9,428,696 B2
(45) Date of Patent: Aug. 30, 2016

(54) PROCESS FOR REFORMING HYDROCARBONS AND PROCESS FOR STARTING UP A GAS-TO-LIQUID PROCESS

(71) Applicant: Haldor Topsøe A/S, Kgs. Lyngby (DK)

(72) Inventor: Per Juul Dahl, Vedbæk (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/409,425

(22) PCT Filed: May 21, 2013

(86) PCT No.: PCT/EP2013/060400
§ 371 (c)(1),
(2) Date: Dec. 18, 2014

(87) PCT Pub. No.: WO2013/189681
PCT Pub. Date: Dec. 27, 2013

(65) Prior Publication Data
US 2015/0337211 A1    Nov. 26, 2015

(30) Foreign Application Priority Data
Jun. 19, 2012 (WO) ................ PCT/EP2012/061709

(51) Int. Cl.
C07C 27/00 (2006.01)
C10G 2/00 (2006.01)
C01B 3/38 (2006.01)
C10K 1/00 (2006.01)
C10K 1/04 (2006.01)
C10K 3/04 (2006.01)

(52) U.S. Cl.
CPC ................ C10G 2/30 (2013.01); C01B 3/382 (2013.01); C01B 3/386 (2013.01); C10K 1/002 (2013.01); C10K 1/04 (2013.01); C10K 3/04 (2013.01); *C01B 2203/0244* (2013.01); *C01B 2203/0261* (2013.01); *C01B 2203/0495* (2013.01); *C01B 2203/062* (2013.01); *C01B 2203/0816* (2013.01); *C01B 2203/0872* (2013.01); *C01B 2203/1241* (2013.01); *C01B 2203/148* (2013.01); *Y02P 20/129* (2015.11)

(58) Field of Classification Search
CPC .................. C01B 3/382; C01B 3/386; C01B 2203/0244; C01B 2203/0261; C01B 2203/0495; C01B 2203/062; C01B 2203/148; C01B 2203/0872; C10K 1/002; C10G 2/30
USPC ................................ 518/700, 702, 703, 704
See application file for complete search history.

(56) References Cited

U.S. PATENT DOCUMENTS

| | | | |
|---|---|---|---|
| 6,114,400 A * | 9/2000 | Nataraj ..................... | C01B 3/36 252/373 |
| 2007/0231221 A1* | 10/2007 | Aasberg-Petersen ... | C01B 3/382 422/129 |
| 2009/0186952 A1 | 7/2009 | Steynberg et al. | |
| 2010/0022668 A1* | 1/2010 | Allam ..................... | C01B 3/382 518/703 |
| 2013/0116347 A1 | 5/2013 | Cheeley et al. | |

FOREIGN PATENT DOCUMENTS

| | | |
|---|---|---|
| CN | 1495126 | 5/2004 |
| EP | 0 287 238 A2 | 10/1988 |
| EP | 1 400 489 A1 | 3/2004 |
| WO | WO 2005/000736 A1 | 1/2005 |
| WO | WO 2010/136980 A1 | 12/2010 |

OTHER PUBLICATIONS

A. Rafiee et al., "Synthesis Gas Production Configurations for Gas-to-Liquid Applications." Chem. Eng. Technol., vol. 35, No. 5, pp. 870-876, 2012.
P. K. Bakkerud, "Update on Synthesis Gas Production for GTL." Catalysis Today, vol. 106, pp. 30-33, 2005.

* cited by examiner

*Primary Examiner* — Jafar Parsa
(74) *Attorney, Agent, or Firm* — Blank Rome LLP

(57) ABSTRACT

The invention relates to a process for the production of synthesis gas by the use of autothermal reforming or catalytic partial oxidation in which, after removal of water, effluent gas from the ATR or CPO is recycled to the feed of the ATR or CPO.

15 Claims, 1 Drawing Sheet

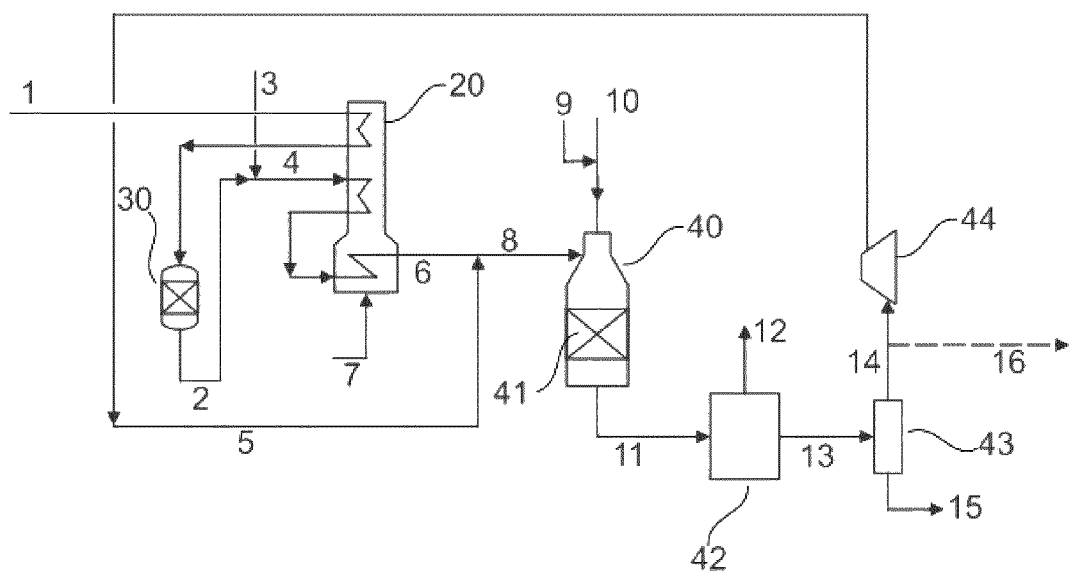

PROCESS FOR REFORMING HYDROCARBONS AND PROCESS FOR STARTING UP A GAS-TO-LIQUID PROCESS

FIELD OF THE INVENTION

The present invention relates to a process for production of synthesis gas used for the production of liquid hydrocarbons, such as diesel and gasoline. The invention relates in particular to a process for the production of synthesis gas by the use of autothermal reforming or catalytic partial oxidation in which the effluent synthesis gas from the autothermal reformer (ATR) or catalytic partial oxidation reactor (CPO) is dehydrated and recycled to the hydrocarbon feedstock of the ATR or CPO. More particularly the invention relates to a method for starting up a gas-to-liquid-process (GTL-process) in which effluent synthesis gas from an ATR or CPO is recycled to the hydrocarbon feedstock in order to gradually decrease the $H_2/CO$ molar ratio of the synthesis gas to a value which is suitable for the downstream GTL process.

BACKGROUND OF THE INVENTION

As used herein GTL-process means a process for production of hydrocarbons requiring a $H_2/CO$ molar ratio of 2.3 or below, such as a process for production of diesel via Fischer-Tropsch synthesis in which synthesis gas is converted into liquid hydrocarbons via Fischer-Tropsch reactions, or equivalent process such as a process for production of gasoline in which synthesis gas is first converted to oxygenated compounds in the form of methanol and dimethyl ether (DME) and subsequently to gasoline as disclosed in U.S. Pat. No. 4,520,216 and U.S. Pat. No. 4,481,305.

Particularly for Fischer-Tropsch operation the synthesis gas is required to have a $H_2/CO$ molar ratio of 1.7 to 2.3. It is known that these values are compatible with those obtainable when utilizing ATR or CPO in the synthesis gas section while running in continuous operation using recycled off-gas from downstream unit, such as a Fischer-Tropsch synthesis unit, as part of the feed. However, we have found that upon the starting up of such processes where off-gas is not available, the $H_2/CO$ molar ratio is above 2.3 for typical natural gas.

EP-A-0287238 discloses a process for the production of hot pressurised hydrogen-containing stream in which a recycle portion of the hot product gas stream from a catalytic partial oxidation reactor is combined with the gas feed in order to preheat the gas fed to the combustion catalyst, thereby enabling easier catalytic combustion. The recycle gas contains not only hydrogen, but also steam.

EP-A-1400489 discloses also a process for the production of synthesis gas in which a portion of the effluent from an autothermal reformer is recycled into the hydrocarbon-steam mixture entering the autothermal reformer by means of a thermo-compressor ejector which uses said mixture as motive fluid. The recycle contains not only hydrogen, but also steam to enable soot-free operation of the autothermal reformer and thereby avoid plugging of the catalyst bed. WO-A-2005/000736 discloses also a reforming process in which a pre-reformed hydrocarbon feed is added to an autothermal reformer and part of the effluent gas is recycled to the autothermal reformer.

It is also known to recycle a portion of the effluent stream in the form of $CO_2$ from an autothermal reformer into the natural gas fed to the autothermal reformer. The effluent stream from the autothermal reformer is dehydrated first and then passed through a $CO_2$-removal unit in order to form a synthesis gas stream and a $CO_2$-stream. The $CO_2$-stream is recycled and mixed with the natural gas upstream the autothermal reformer.

SUMMARY OF THE INVENTION

It is expected that the recycle of a $CO_2$-stream into the feed of an ATR implies that the $H_2/CO$ molar ratio in the synthesis gas leaving the ATR can be decreased. We have now found that the provision of a $CO_2$-removal unit, which involves a heavy penalty in capital costs, can be excluded and the recycle gas, now with significant lower concentration of carbon dioxide, be mixed with the feed to the ATR or CPO, while at the same time being able to reduce the $H_2/CO$ molar ratio of the synthesis gas from the ATR or CPO. This is highly counter-intuitive since the removal of the $CO_2$-removal unit results in the recycle of a stream being much richer in hydrogen. This would be expected to result in a higher $H_2/CO$ molar ratio in the synthesis gas, yet surprisingly the $H_2/CO$ molar ratio is decreased.

Compared to prior art disclosures such as EP-A-1400489 in which the presence of water in the recycle is mandatory in order to avoid pressure loss upstream the ATR and in order to reduce soot formation in the ATR, the presence of water in the recycle is not necessary according to the present invention.

Hence, the invention provides a process for the production of synthesis gas according to the following features in accordance with the appended claims:

1. Process for the production of synthesis gas from a hydrocarbon feedstock comprising: adding steam to the hydrocarbon feedstock to form a mixture of hydrocarbons and steam, passing said mixture through an autothermal reforming stage (ATR) or catalytic partial oxidation (CPO) stage and withdrawing a stream of hot effluent synthesis gas from the ATR or CPO, removing water from said hot effluent synthesis gas to form a dehydrated synthesis gas, and directly recycling at least a portion of said dehydrated synthesis gas into the hydrocarbon feedstock or into said mixture of hydrocarbons and steam, and without passing said dehydrated synthesis gas through a carbon-dioxide removal in the recycle, in which the molar ratio of dehydrated synthesis gas to mixture of hydrocarbons and steam is 0.1 to 2.5.

2. Process according to feature 1 in which the steam to carbon molar ratio at which the ATR or CPO is operated is 0.2 to 3.0.

3. Process according to feature 1 or 2 in which the dehydrated synthesis gas is introduced to the hydrocarbon feedstock or mixture of hydrocarbons and steam by a recycle-compressor.

4. Process according to feature 1 or 2 in which the dehydrated synthesis gas is introduced to the hydrocarbon feedstock or mixture of hydrocarbons and steam by an ejector.

5. Process according to any of features 1 to 4 in which prior to removing water from said hot effluent synthesis gas, the synthesis gas is cooled, preferably by passing the synthesis gas through a cooling train of waste heat boilers and/or steam superheaters.

6. Process according to any of features 1-5 in which the hot effluent synthesis gas is used as heat exchanging medium in a heat exchange reformer operated in series or in parallel with the ATR or CPO.

7. Process according to any of features 1-6 in which said hydrocarbon feedstock is a gas that has passed through at least one pre-reforming stage, preferably an adiabatic pre-reforming stage.

8. Method according to any of features 1-7 in which said hydrocarbon feedstock or said mixture of hydrocarbons and steam are preheated, preferably in a fired-heater, before being combined with said dehydrated synthesis gas.

9. Method for starting up a gas-to-liquid (GTL) process comprising: adding steam to a hydrocarbon feedstock to form a mixture of hydrocarbons and steam, passing said mixture through an autothermal reforming stage (ATR) or catalytic partial oxidation (CPO) stage and withdrawing a stream of hot effluent synthesis gas from the ATR or CPO, removing water from said hot effluent synthesis gas to form a dehydrated synthesis gas, directly recycling at least a portion of said dehydrated synthesis gas into the hydrocarbon feedstock or into said mixture of hydrocarbons and steam without passing said dehydrated synthesis gas through a carbon-dioxide removal in the recycle, and in which the molar ratio of dehydrated synthesis gas to mixture of hydrocarbons and steam is 0.1 to 2.5, subsequently passing at least part of the dehydrated synthesis gas as feed to downstream GTL process and shifting from recycling dehydrated synthesis gas to recycling off-gas.

10. Method according to feature 9 wherein the $H_2/CO$ molar ratio of the dehydrated synthesis gas is below 2.3, preferably below 2.2, more preferably below 2.1.

11. Method according to feature 9 or 10 in which said hydrocarbon feedstock is a gas that has passed through at least one pre-reforming stage, preferably an adiabatic pre-reforming stage.

12. Method according to any of features 9-11 in which said hydrocarbon feedstock or said mixture of hydrocarbons and steam are preheated, preferably in a fired-heater, before being combined with said dehydrated synthesis gas.

13. Method according to any of features 9-12 in which the dehydrated synthesis gas is introduced to the hydrocarbon feedstock or mixture of hydrocarbons and steam by a recycle-compressor.

14. Method according to feature in which the recycle-compressor is an existing recycle-compressor used for recycling off-gas from downstream gas-to-liquid (GTL) process.

15. Method according to feature 13 or 14 in which the off-gas after passing through the recycle-compressor is subjected to a conversion stage for removal of olefins, preferably by hydrogenation.

BRIEF DESCRIPTION OF THE FIGURE

The invention is further illustrated by reference to the attached FIGURE which shows schematics of a specific embodiment of the invention in which the recycle is used during the starting-up of a GTL process.

DETAILED DESCRIPTION

As used herein the term "autothermal reformer (ATR)" means stand-alone reactors which are fed directly with a hydrocarbon feedstock, or reactors which are fed directly with a pre-reformed hydrocarbon feedstock, or secondary reformers which are reactors fed by primary reformed gas, i.e. reactors using as hydrocarbon feed reformed gas from a primary reformer such as a steam methane reformer (SMR) or heat exchange reformer.

The terms "autothermal reformer (ATR)" and "catalytic partial oxidation" refers also to reactors in which the required heat for the reforming reactions is provided by internal combustion of the hydrocarbon feed with oxygen, air or enriched air that are added to the reactor. The reforming reactions take place in a fixed bed of reforming catalyst arranged downstream in the reactor, with catalytic combustion only taking place in catalytic partial oxidation reactors.

As used herein the terms water and steam are used interchangeably and refer to the presence of $H_2O$ molecules in a given stream of the process.

As used herein the term "dehydrated synthesis gas" means a synthesis gas from the ATR or CPO from which water has been removed. Since not all water can be removed the dehydrated synthesis gas as used herein contains water in amounts of 1 mol % or less.

As used herein the term "directly recycling at least a portion of said dehydrated synthesis gas" means that this gas is recycled immediately without passing through an intermediate stage in which the composition of the dehydrated gas may be changed, particularly without passing through an intermediate stage of Fischer-Tropsch synthesis where the synthesis gas is changed by contact with an active Fischer-Tropsch catalyst.

As used herein the term "steam to carbon molar ratio at which the ATR or CPO is operated" means the ratio of total amount of steam added to the hydrocarbon feed to the ATR or CPO and to oxidant gas entering the ATR or CPO to the amount of carbon molecules fed to the ATR or CPO. Otherwise the term "steam to carbon molar ratio" refers to the ratio of carbon molecules to $H_2O$ molecules in a given stream.

As used herein, the term off-gas means tail gas from the downstream GTL process, such as Fischer-Tropsch tail gas; such tail gas contains normally carbon monoxide, carbon dioxide, hydrogen, various hydrocarbons including olefins and a range of other components.

In a first aspect the invention encompasses a process for the production of synthesis gas from a hydrocarbon feedstock comprising: adding steam to the hydrocarbon feedstock to form a mixture of hydrocarbons and steam, passing said mixture through an autothermal reforming stage (ATR) or catalytic partial oxidation (CPO) stage and withdrawing a stream of hot effluent synthesis gas from the ATR or CPO, removing water from said hot effluent synthesis gas to form a dehydrated synthesis gas, and directly recycling at least a portion of said dehydrated synthesis gas into the hydrocarbon feedstock or into said mixture of hydrocarbons and steam, and without passing said dehydrated synthesis gas through a carbon-dioxide removal in the recycle, in which the molar ratio of dehydrated synthesis gas to mixture of hydrocarbons and steam is 0.1 to 2.5.

More specifically, the invention encompasses in a first aspect the production of synthesis gas from a hydrocarbon feedstock comprising reducing the $H_2/CO$ molar ratio of said synthesis gas by: adding steam to the hydrocarbon feedstock to form a mixture of hydrocarbons and steam, passing said mixture through an autothermal reforming stage (ATR) or catalytic partial oxidation (CPO) stage and withdrawing a stream of hot effluent synthesis gas from the ATR or CPO, removing water from said hot effluent synthesis gas to form a dehydrated synthesis gas, and directly recycling at least a portion of said dehydrated synthesis gas into the hydrocarbon feedstock or into said mixture of hydrocarbons and steam, and without passing said dehydrated synthesis gas through a carbon-dioxide removal in the recycle, in which the molar ratio of dehydrated synthesis gas to mixture of hydrocarbons and steam is 0.1 to 2.5.

Thus, it is now possible in a simple, elegant and inexpensive manner to bring the $H_2/CO$ molar ratio of the synthesis gas from the ATR or CPO down from about of 2.6 or 2.5 to a level suitable for downstream operations, in which the $H_2/CO$ molar ratio preferably is below 2.3, such as 2.2 or lower such as 2.15 or 2.10 or even lower. For downstream Fischer-Tropsch synthesis or gasoline synthesis according to U.S. Pat. No. 4,520,216 and U.S. Pat. No. 4,481,305, the desired $H_2/CO$ molar ratio is 1.8 to 2.3. It would be understood that the content of hydrogen in the recycled gas is high, i.e. above 50 or even above 60 mol %. This will at first glance mean that the absence of a $CO_2$-removal unit in the recycle, out of which a $CO_2$-recycle is formed, will result in higher $H_2/CO$ molar ratios in the synthesis gas. Yet, surprisingly it is now possible to actually reduce the $H_2/CO$ molar ratio of the synthesis gas from the ATR or CPO to acceptable values for downstream processes, as low as 2.2 or 2.1 or even lower, while at the same time omitting the use of the highly expensive $CO_2$-removal unit. The removal of water from the recycle is also highly counter-intuitive since water is needed for the operation of the ATR or CPO. Yet, while water is needed for the reforming reactions taking place in the ATR or CPO ($CH_4 + H_2O = CO + 3H_2$), the purposive removal of water in the recycle seems to force the shift reaction in the ATR or CPO ($CO + H_2O = H_2 + CO_2$) to the left, thus reducing the $H_2/CO$ molar ratio in the effluent gas from this unit.

Preferably the portion of said dehydrated synthesis gas that is recycled is more than 25 vol %, more preferably 30-70 vol %, even more preferably 30-50 vol %, most preferably 30-40 vol %, such as 32-36 vol %. At these particular ranges the best results in terms of lowering the $H_2/CO$ molar ratios to 2.2 or lower, or 2.1 or even lower, are obtained.

The ATR or CPO according to the present disclosure may be operated under soot-free conditions and thus no addition of hydrogen and steam to the ATR or CPO is necessary, as otherwise required in EP-A-1400489 and WO-A-2005/000736.

In a specific embodiment the steam to carbon molar ratio at which the ATR or CPO is operated is 0.2 to 3.0. Preferably the ATR or CPO is operated at 0.3 to 1.0, more preferably 0.4-0.8. The lower the steam to carbon molar ratio the better the process economy, since less steam has to be carried through the plant and thereby equipment size can be reduced.

In another specific embodiment in connection with one of the above or below embodiments, the dehydrated synthesis gas is introduced to the hydrocarbon feedstock or the mixture of hydrocarbons and steam by a recycle-compressor. Preferably the recycle-compressor is an existing recycle-compressor used for recycling off-gas (tail gas) from downstream gas-to-liquid (GTL) process, more preferably from Fischer-Tropsch synthesis. This enables in an efficient and inexpensive manner to conduct the process as no additional capital investments are required to provide the recycle.

In another specific embodiment in connection with one of the above or below embodiments, the dehydrated synthesis gas is introduced to the hydrocarbon feedstock or mixture of hydrocarbons and steam by an ejector, such as a thermocompressor ejector or similar means. These require the need of a motive fluid to operate, which is preferably the mixture of hydrocarbon feed and steam fed to the ATR or CPO.

In a specific embodiment in connection with one or more of the above or below embodiments, prior to removing water from said hot effluent synthesis gas from the ATR or CPO, the synthesis gas is cooled, preferably by passing the synthesis gas through a cooling train of waste heat boilers and/or steam superheaters. Since the temperature of the effluent synthesis gas is normally about 1000° C., the waste heat boilers enable heat recovery for steam production to be used in the process, and prepare the synthesis gas for subsequent dewatering in e.g. a knock-off drum before being passed through the recycle-compressor.

In a specific embodiment in connection with one or more of the above or below embodiments, the hot effluent synthesis gas is used as heat exchanging medium in a heat exchange reformer operated in series or in parallel with the ATR or CPO. This enables that a higher process economy be achieved, since the hot effluent gas at about 1000° C. can be used to drive the catalytic reforming reactions in the heat exchange reformer.

In a specific embodiment in connection with one or more of the above or below embodiments, said hydrocarbon feedstock is a gas that has passed through at least one pre-reforming stage. Preferably the hydrocarbon feedstock is natural gas where higher hydrocarbons than methane are normally present. In the pre-reforming stage, all higher hydrocarbons ($C_{2+}$) are converted into a mixture of carbon oxides, hydrogen and methane. The pre-reforming stage gives flexibility to the process as hydrocarbon feedstocks of varying compositions can be handled, such as different types of natural gas feeds to heavy naphtha. Preferably the pre-reforming stage is conducted in an adiabatic pre-reformer containing a fixed bed of reforming catalyst.

The steam-to-carbon ratio of the pre-reformed gas is preferably 0.2-1.0, more preferably 0.3-0.7, most preferably 0.5.

In a specific embodiment in connection with one or more of the above or below embodiments, said hydrocarbon feedstock or said mixture of hydrocarbons and steam are preheated, preferably in a fired-heater, before being combined with said dehydrated synthesis gas. This enables protection of the fired-heater and thereby longer lifetime.

In a second aspect, the invention encompasses also a method for starting up a gas-to-liquid (GTL) process comprising: adding steam to a hydrocarbon feedstock to form a mixture of hydrocarbons and steam, passing said mixture through an autothermal reforming stage (ATR) or catalytic partial oxidation (CPO) stage and withdrawing a stream of hot effluent synthesis gas from the ATR or CPO, removing water from said hot effluent synthesis gas to form a dehydrated synthesis gas, directly recycling at least a portion of said dehydrated synthesis gas into the hydrocarbon feedstock or into said mixture of hydrocarbons and steam without passing said dehydrated synthesis gas through a carbon-dioxide removal in the recycle, and in which the molar ratio of dehydrated synthesis gas to mixture of hydrocarbons and steam is 0.1 to 2.5, subsequently passing at least part of the dehydrated synthesis gas as feed to downstream GTL process and shifting from recycling dehydrated synthesis gas to recycling off-gas.

Hence, during start-up the synthesis gas produced in the ATR or CPO, after water has been removed, is used as recycle gas while no synthesis gas is used for downstream GTL processes. Initially, the $H_2/CO$ molar ratio of the synthesis gas from the ATR or CPO is about 2.6 or 2.5. When the required $H_2/CO$ molar ratio of 2.3 or below, more preferably 2.2 or below, most preferably 2.1 or below, in the dehydrated synthesis gas is obtained the dehydrated synthesis gas is subsequently passed to the downstream processes, in particular Fischer-Tropsch or equivalent requiring $H_2/CO$ molar ratios between 1.8 and 2.3, thereby shifting from recycling dehydrated synthesis gas to recycling off-gas from said downstream process. The higher the $H_2/CO$ molar ratio of the dehydrated synthesis gas during start-up, the more off-spec product (product outside required specifications) and off-gas will be produced. As a result the control of the process becomes more difficult.

As mentioned before, the removal of water from the recycle is highly counter-intuitive, since water is needed for the operation of the ATR or CPO. Yet, while water is needed for the reforming reactions taking place in the ATR or CPO ($CH_4+H_2O=CO+3H_2$), the purposive removal of water in the recycle seems to force the shift reaction in the ATR or CPO ($CO+H_2O=H_2+CO_2$) to the left, thus reducing the $H_2/CO$ molar ratio in the effluent gas from this unit.

Preferably the portion of said dehydrated synthesis gas that is recycled is more than 25 vol %, more preferably 30-70 vol %, even more preferably 30-50 vol %, most preferably 30-40 vol %, such as 32-36 vol %. At these particular ranges the best results in terms of lowering the H2/CO molar ratios to 2.2 or lower, or 2.1 or even lower, are obtained.

In a specific embodiment in connection with the above embodiment of the second aspect of the invention, said hydrocarbon feedstock is a gas that has passed through at least one pre-reforming stage, preferably an adiabatic pre-reforming stage.

As mentioned before, the pre-reforming enables inter alia the handling of hydrocarbon feedstocks of varying compositions during start-up. More specifically, the hydrocarbon feedstock is preferably natural gas where higher hydrocarbons than methane are normally present. In the pre-reforming stage, all higher hydrocarbons ($C_{2+}$) are converted into a mixture of carbon oxides, hydrogen and methane. The pre-reforming stage gives flexibility to the process as hydrocarbon feedstocks of varying compositions can be handled, such as different types of natural gas feeds to heavy naphta. Preferably the pre-reforming stage is conducted in an adiabatic pre-reformer containing a fixed bed of reforming catalyst.

The steam-to-carbon ratio of the thus pre-reformed gas is preferably 0.2-1.0, more preferably 0.3-0.7, most preferably 0.5.

In a specific embodiment in connection with one or more of the above and below embodiments according to the second aspect of the invention, there is also provided a method in which said hydrocarbon feedstock or said mixture of hydrocarbons and steam are preheated, preferably in a fired-heater, before being combined with said dehydrated synthesis gas. Thus, opposite to situations where e.g. $CO_2$-gas is recycled and added upstream a pre-heater, the dehydrated synthesis gas according to the present invention is added downstream the pre-heater, which is preferably a fired-heater. This, as mentioned above turns out to increase the lifetime of the fired-heater.

In a specific embodiment in connection with one of the above or below embodiments according to the second aspect of the invention, the dehydrated synthesis gas is introduced to the hydrocarbon feedstock or mixture of hydrocarbons and steam by a recycle-compressor.

Preferably the recycle-compressor is an existing recycle-compressor used for recycling off-gas from downstream gas-to-liquid (GTL) process. Preferably said compressor is a Fischer-Tropsch off-gas compressor. During normal (continuous) operation of the downstream process, such as a Fischer-Tropsch plant, dehydrated synthesis gas is normally passed through Fischer-Tropsch synthesis for production of liquid hydrocarbons. Off-gas gas from this synthesis (tail gas) is recycled to the reforming section of the plant via a dedicated recycle-compressor. We have found that such recycle-compressor can be used during start-up of the plant by passing the dehydrated synthesis gas directly through the recycle-compressor. This conveys advantages not only in terms of capital costs since there is no need for an expensive separate compressor dedicated only to handle a recycle stream during start-up, but also a better process economy due to more stable operation of the burner in the autothermal reformer. It would be understood that under normal operation, off-gas from downstream process is normally passed through the recycle compressor and thereafter to the reforming section of the plant. Off-gas may for instance be sent to the ATR and thus ATR-burner design is adapted to the use of such gas. During start-up such off-gas is "replaced" by the dehydrated synthesis gas via the existing recycle-compressor, and as such the ATR-burner is already adapted to this condition.

In another specific embodiment in connection with one or more of the above embodiments, the off-gas after passing through the recycle-compressor is subjected to a conversion stage for removal of olefins, preferably by hydrogenation.

The accompanying FIGURE shows a schematic of a specific embodiment of the invention. Natural gas stream 1 is preheated in fired heater 20 using fuel 7 as energy source and then passed through desulphurisation unit 30. The desulfurized natural gas 2 is mixed with steam 3 to form a mixture of hydrocarbons and steam 4 which is then preheated in same fired heater 20 and subsequently combined with dehydrated recycle stream 5. The combined stream 8 is passed to autothermal reformer (ATR) 40 containing a fixed bed of catalyst 41. Steam 9 is mixed with oxygen or enriched air 10 (>44 mole % oxygen) and added to the ATR 40. The hot effluent synthesis gas 11 from the ATR leaves at about 1000° C. and is then passed through a cooling train 42 of waste heat boilers under the production of steam 12 to be used in the process. The cooled synthesis gas 13 is then passed to a knock-off drum 43 to remove water as condensate 15 thereby creating dehydrated synthesis gas 14. At least a portion of this dehydrated synthesis gas is recycled into the mixture of hydrocarbons and steam 4 without passing said dehydrated synthesis gas through a carbon-dioxide removal in the recycle stream 14 or 5. During start-up of the plant, synthesis gas line 16 for the downstream process will be shut down. After establishing an appropriate $H_2/CO$ molar ratio of 2.3 or below, the synthesis gas line 16 is opened, and downstream GLT-process conducted.

Example 1

This example is according to the prior art. Dehydrated synthesis gas from an ATR is passed through a $CO_2$-removal unit and the resulting $CO_2$ stream is recycled back to the hydrocarbon feed to the ATR. Specifically, a mixture of hydrocarbon and steam having a steam-to-carbon molar ratio of 0.49 after having passed through an adiabatic pre-reformer, is mixed with the recycled $CO_2$ obtained by passing dehydrated synthesis gas from the ATR through a $CO_2$-removal unit. The $CO_2$-free synthesis gas is not recycled to the ATR. Starting with no recycle and thereby from a $H_2/CO$ molar ratio of 2.46 in the hot effluent gas from the ATR, by recycling $CO_2$ it is possible to bring this molar ratio down to 2.15. Table 1 shows the results.

Example 2

This example is according to the specific embodiment of the invention. The difference with respect to Example 1 is that there is no $CO_2$-removal unit in the recycle and thereby no recycle of $CO_2$. Dehydrated synthesis gas 5 is mixed with a stream of pre-reformed gas having a steam-to-carbon molar ratio of 0.49 and the mixture is fed to the ATR under the addition of a combined oxygen-steam stream. The molar ratio of dehydrated synthesis gas to mixture of hydrocarbons and steam is 1.1. Hot effluent gas (synthesis gas) from the ATR is cooled in a cooling train, then dehydrated and the dehydrated synthesis gas is recycled via a recycle-compressor to the ATR feed. The recycled gas is 32 vol %. Table 2 shows the results. Starting with no recycle and thereby from a $H_2/CO$ molar ratio of 2.46 in the hot effluent gas from the ATR, it is seen that despite recycling dehydrated synthesis gas (syngas recycle) containing as high as 63 mol % hydrogen it is possible to obtain a $H_2/CO$ molar ratio of 2.15 in the effluent gas from the ATR.

TABLE 1

| | Stream | | | | | | | | | |
|---|---|---|---|---|---|---|---|---|---|---|
| | $CO_2$-recycle | | Pre-reform. gas | | ATR effluent | | Oxygen to ATR | | Oxygen-steam | |
| Comp. | $Nm^3/h$ | mol % | $Nm^3/h$ | mol % | $Nm^3/h$ | mol % | $Nm^3/h$ | mol % | $Nm^3/h$ | mol % |
| Ar | | | | | 278 | 0.08 | 278 | 0.50 | 278 | 0.42 |
| $CH_4$ | | | 93295 | 62.3 | 2535 | 0.69 | | | | |
| CO | | | 30 | 0.02 | 82566 | 22.4 | | | | |
| $CO_2$ | 11508 | 100 | 1843 | 1.23 | 21576 | 5.86 | | | | |
| $H_2$ | | | 7786 | 5.20 | 177516 | 48.2 | | | | |
| $N_2$ | | | 951 | 0.63 | 961 | 0.26 | | | | |
| $O_2$ | | | | | | | 55374 | 99.5 | 55375 | 84.4 |
| $H_2O$ | | | 45851 | 30.62 | 82994 | 22.53 | | | 9953 | 15.2 |
| Total | 11508 | 100 | 149756 | 100 | 368426 | 100 | 55652 | 100 | 65606 | 100 |

TABLE 2

| | Stream | | | | | | | | | |
|---|---|---|---|---|---|---|---|---|---|---|
| | Syngas recycle | | Pre-reform. gas | | ATR effluent | | Oxygen to ATR | | Oxygen-steam | |
| Comp. | $Nm^3/h$ | mol % | $Nm^3/h$ | mol % | $Nm^3/h$ | mol % | $Nm^3/h$ | mol % | $Nm^3/h$ | mol % |
| Ar | 202 | 0.12 | | | 516 | 0.10 | | 0.50 | | 0.43 |
| $CH_3OH$ | 717 | 0.43 | | | | | | | | |
| $CH_4$ | 2326 | 1.40 | 93295 | 62.3 | 5952 | 1.14 | | | | |
| CO | 47762 | 28.7 | 30 | 0.02 | 125707 | 24.0 | | | | |
| $CO_2$ | 10205 | 6.12 | 1843 | 1.23 | 24520 | 4.69 | | | | |
| $H_2$ | 104843 | 62.9 | 7786 | 5.20 | 270269 | 51.7 | | | | |
| $N_2$ | 599 | 0.36 | 951 | 0.63 | 1567 | 0.30 | | | | |
| $O_2$ | | | | | | | 62612 | 99.5 | 62612 | 85.9 |
| $H_2O$ | | | 45851 | 30.62 | 94315 | 18.0 | | | 9953 | 13.7 |
| Total | 166654 | 100 | 149756 | 100 | 522846 | 100 | 62927 | 100 | 72880 | 100 |

The invention claimed is:

1. A process for the production of synthesis gas from a hydrocarbon feedstock comprising:
    adding steam to the hydrocarbon feedstock to form a mixture of hydrocarbons and steam,
    passing said mixture through an autothermal reforming stage (ATR) or catalytic partial oxidation (CPO) stage and withdrawing a stream of hot effluent synthesis gas from the ATR or CPO,
    removing water from said hot effluent synthesis gas to form a dehydrated synthesis gas, and
    directly recycling at least a portion of said dehydrated synthesis gas into the hydrocarbon feedstock or into said mixture of hydrocarbons and steam, and without passing said dehydrated synthesis gas through a carbon-dioxide removal in the recycle, in which the molar ratio of dehydrated synthesis gas to mixture of hydrocarbons and steam is 0.1 to 2.5.

2. The process according to claim 1 in which the steam to carbon molar ratio at which the ATR or CPO is operated is 0.2 to 3.0.

3. The process according to claim 1 in which the dehydrated synthesis gas is introduced to the hydrocarbon feedstock or mixture of hydrocarbons and steam by a recycle-compressor.

4. The process according to claim 1 in which the dehydrated synthesis gas is introduced to the hydrocarbon feedstock or mixture of hydrocarbons and steam by an ejector.

5. The process according to claim 1 in which prior to removing water from said hot effluent synthesis gas, the synthesis gas is cooled by passing the synthesis gas through a cooling train of waste heat boilers and/or steam superheaters.

6. The process according to claim 1 in which the hot effluent synthesis gas is used as heat exchanging medium in a heat exchange reformer operated in series or in parallel with the ATR or CPO.

7. The process according to claim 1 in which said hydrocarbon feedstock is a gas that has passed through at least one pre-reforming stage.

8. The method according to claim 1 in which said hydrocarbon feedstock or said mixture of hydrocarbons and steam are preheated before being combined with said dehydrated synthesis gas.

9. A method for starting up a gas-to-liquid (GTL) process comprising:
   adding steam to a hydrocarbon feedstock to form a mixture of hydrocarbons and steam,
   passing said mixture through an autothermal reforming stage (ATR) or catalytic partial oxidation (CPO) stage and withdrawing a stream of hot effluent synthesis gas from the ATR or CPO,
   removing water from said hot effluent synthesis gas to form a dehydrated synthesis gas,
   directly recycling at least a portion of said dehydrated synthesis gas into the hydrocarbon feedstock or into said mixture of hydrocarbons and steam without passing said dehydrated synthesis gas through a carbon-dioxide removal in the recycle, and in which the molar ratio of dehydrated synthesis gas to mixture of hydrocarbons and steam is 0.1 to 2.5, and
   subsequently passing at least part of the dehydrated synthesis gas as feed to downstream GTL process and shifting from recycling dehydrated synthesis gas to recycling off-gas.

10. The method according to claim 9 wherein the $H_2$/CO molar ratio of the dehydrated synthesis gas is below 2.3.

11. The method according to claim 9 in which said hydrocarbon feedstock is a gas that has passed through at least one pre-reforming stage.

12. The method according to claim 9 in which said hydrocarbon feedstock or said mixture of hydrocarbons and steam are preheated in a fired-heater, before being combined with said dehydrated synthesis gas.

13. The method according to claim 9 in which the dehydrated synthesis gas is introduced to the hydrocarbon feedstock or mixture of hydrocarbons and steam by a recycle-compressor.

14. The method according to claim 13 in which the recycle-compressor is an existing recycle-compressor used for recycling off-gas from downstream gas-to-liquid (GTL) process.

15. The method according to claim 13 in which the off-gas after passing through the recycle-compressor is subjected to a conversion stage for removal of olefin by hydrogenation.

* * * * *